United States Patent
Kshirsagar et al.

(10) Patent No.: US 9,580,177 B2
(45) Date of Patent: *Feb. 28, 2017

(54) HYBRID ON-BOARD GENERATION OF OXYGEN FOR AIRCRAFT PASSENGERS

(71) Applicant: B/E AEROSPACE, INC., Wellington, FL (US)

(72) Inventors: Girish S. Kshirsagar, Edmond, OK (US); Detlev Degenhardt, Stockelsdorf (DE)

(73) Assignee: B/E Aerospace, Inc., Wellington, FL (US)

(*) Notice: Subject to any disclaimer, the term of this patent is extended or adjusted under 35 U.S.C. 154(b) by 76 days.

This patent is subject to a terminal disclaimer.

(21) Appl. No.: 14/824,318

(22) Filed: Aug. 12, 2015

(65) Prior Publication Data

US 2015/0343244 A1    Dec. 3, 2015

Related U.S. Application Data

(63) Continuation of application No. 13/483,345, filed on May 30, 2012, now Pat. No. 9,120,571, which is a (Continued)

(51) Int. Cl.
A62B 7/08 (2006.01)
A62B 18/02 (2006.01)
(Continued)

(52) U.S. Cl.
CPC ............ B64D 13/00 (2013.01); A62B 7/08 (2013.01); A62B 7/14 (2013.01); A62B 9/00 (2013.01);
(Continued)

(58) Field of Classification Search
None
See application file for complete search history.

(56) References Cited

U.S. PATENT DOCUMENTS 3,981,300 A    9/1976  Williams
4,681,602 A    7/1987  Glenn et al.
(Continued)

FOREIGN PATENT DOCUMENTS

EP    1106245 A2    6/2001
EP    2092962 A1    8/2009
(Continued)

OTHER PUBLICATIONS

EPO, International Search Report in International Patent No. PCT/US2013/041674 dated Oct. 22, 2013.
(Continued)

Primary Examiner — Bradley Philips
Assistant Examiner — Joseph D Boecker
(74) Attorney, Agent, or Firm — Shumaker, Loop & Kendrick, LLP (57) ABSTRACT

Provided herein is a hybrid system for generating oxygen on-board an aircraft for passengers and/or flight crew to breath. The system includes a first chemical oxygen generator component configured to promptly supply oxygen suitable for breathing upon an emergency situation arising and during an initial descent mode. Heat produced from the exothermic decomposition reactions inherent in several types of chemical oxygen generators can be harvested and feed to a second oxygen generator. The second oxygen generator is a solid electrolyte oxygen separation system that catalytically separates oxygen from air inside specialized ceramic materials at high temperatures, about 650° C. to 750° C., using electrical voltage. The ability to feed heat from the first oxygen generator to the second oxygen generator substantially reduces the lag time until the second ceramic oxygen generator is available to take over as the oxygen supply.

12 Claims, 3 Drawing Sheets

Related U.S. Application Data continuation-in-part of application No. 13/481,057, filed on May 25, 2012.

(51) Int. Cl.
  *A62B 9/00* (2006.01)
  *B64D 13/00* (2006.01)
  *B64D 11/00* (2006.01)
  *A62B 7/14* (2006.01)
  *A62B 21/00* (2006.01)
  *B64D 13/06* (2006.01)

(52) U.S. Cl.
  CPC .............. *A62B 18/02* (2013.01); *B64D 11/00* (2013.01); *A62B 21/00* (2013.01); *B64D 2013/0677* (2013.01); *B64D 2231/02* (2013.01); *Y02T 50/44* (2013.01); *Y02T 50/46* (2013.01); *Y02T 50/56* (2013.01)

(56) References Cited

U.S. PATENT DOCUMENTS

| | | | |
|---|---|---|---|
| 4,891,189 A | | 1/1990 | Harwood |
| 5,131,225 A | * | 7/1992 | Roettger ............... B64D 41/00 60/727 |
| 5,169,415 A | * | 12/1992 | Roettger .............. B01D 53/326 128/204.29 |
| 5,185,014 A | | 2/1993 | Prasad |
| 5,299,568 A | | 4/1994 | Forare et al. |
| 5,338,516 A | | 8/1994 | Zhang et al. |
| 5,343,859 A | | 9/1994 | Kikut |
| 5,383,449 A | | 1/1995 | Forare et al. |
| 5,390,666 A | | 2/1995 | Kimm et al. |
| 5,438,980 A | | 8/1995 | Phillips |
| 5,660,171 A | | 8/1997 | Kimm et al. |
| 5,709,732 A | | 1/1998 | Prasad |
| 5,711,787 A | | 1/1998 | Neill et al. |
| 5,733,508 A | * | 3/1998 | Logunov ................ A62B 21/00 252/186.1 |
| 5,783,105 A | | 7/1998 | Zhang et al. |
| 5,881,717 A | | 3/1999 | Isaza et al. |
| 5,902,379 A | | 5/1999 | Phillips et al. |
| 6,033,457 A | | 3/2000 | Lawless et al. |
| 6,089,230 A | | 7/2000 | Barker et al. |
| 6,290,759 B1 | | 9/2001 | Fenner et al. |
| 6,319,305 B1 | * | 11/2001 | Phillips .................... A62B 7/14 96/134 |
| 6,352,624 B1 | | 3/2002 | Crome et al. |
| 6,491,739 B1 | * | 12/2002 | Crome ................... B01D 63/02 95/14 |
| 6,604,558 B2 | | 8/2003 | Sauer |
| 6,726,558 B1 | | 4/2004 | Meirav |
| 6,729,359 B2 | | 5/2004 | Jones |
| 6,739,359 B2 | | 5/2004 | Jones et al. |
| 6,866,701 B2 | | 3/2005 | Meirav |
| 6,866,794 B1 | | 3/2005 | Zhang |
| 6,955,710 B2 | | 10/2005 | Lessi et al. |
| 6,989,044 B2 | | 1/2006 | Zhang et al. |
| 6,997,970 B2 | | 2/2006 | Crome |
| 7,048,231 B2 | | 5/2006 | Jones |
| 7,055,780 B2 | | 6/2006 | Phillips |
| 7,081,153 B2 | | 7/2006 | Leigh et al. |
| 7,087,804 B2 | | 8/2006 | O'Rear |
| 7,144,445 B2 | | 12/2006 | Gueret et al. |
| 7,152,635 B2 | | 12/2006 | Moravec et al. |
| 7,172,156 B1 | | 2/2007 | Jones |
| 7,172,157 B2 | | 2/2007 | Jones |
| 7,204,868 B2 | | 4/2007 | Snow, Jr. |
| 7,231,162 B2 | | 6/2007 | Brenner et al. |
| 7,273,507 B2 | | 9/2007 | Schwalm |
| 7,306,644 B2 | | 12/2007 | Leigh et al. |
| 7,374,601 B2 | | 5/2008 | Bonchonsky et al. |
| 7,442,230 B2 | | 10/2008 | Snow, Jr. |
| 7,442,238 B2 | | 10/2008 | Rittner et al. |
| 7,445,660 B2 | | 11/2008 | Hart et al. |
| 7,481,214 B2 | | 1/2009 | Eilers |
| 7,509,968 B2 | | 3/2009 | Surawski |
| 7,517,388 B2 | | 4/2009 | Jensvold |
| 7,592,284 B2 | | 9/2009 | Zaki et al. |
| 7,608,131 B2 | | 10/2009 | Jensen |
| 7,625,434 B2 | | 12/2009 | Tom et al. |
| 7,645,324 B2 | | 1/2010 | Rode et al. |
| 7,694,674 B2 | | 4/2010 | Crome et al. |
| 7,717,983 B2 | | 5/2010 | Semmere et al. |
| 8,517,018 B2 | | 8/2013 | Wenzel et al. |
| 2002/0088504 A1 | | 7/2002 | Sauer |
| 2003/0145726 A1 | | 8/2003 | Gueret et al. |
| 2003/0205132 A1 | | 11/2003 | Lessi et al. |
| 2003/0233936 A1 | | 12/2003 | Crome |
| 2004/0000353 A1 | | 1/2004 | Jones |
| 2004/0065778 A1 | | 4/2004 | Jones |
| 2004/0112211 A1 | | 6/2004 | Meirav |
| 2004/0151639 A1 | | 8/2004 | Jones et al. |
| 2004/0245390 A1 | | 12/2004 | Meckes et al. |
| 2004/0259961 A1 | | 12/2004 | O'Rear |
| 2005/0092177 A1 | | 5/2005 | Bonchonsky et al. |
| 2005/0115404 A1 | | 6/2005 | Leigh et al. |
| 2005/0160909 A1 | | 7/2005 | Meirav |
| 2005/0173017 A1 | | 8/2005 | Moravec et al. |
| 2005/0247197 A1 | | 11/2005 | Snow |
| 2005/0263005 A1 | | 12/2005 | Rittner et al. |
| 2006/0011063 A1 | | 1/2006 | Zhou |
| 2006/0021652 A1 | | 2/2006 | Surawski |
| 2006/0062707 A1 | * | 3/2006 | Crome ................... A62B 21/00 422/305 |
| 2006/0117950 A1 | | 6/2006 | Lessi |
| 2006/0117956 A1 | | 6/2006 | Schwalm |
| 2006/0151669 A1 | | 7/2006 | Jones |
| 2006/0169142 A1 | | 8/2006 | Rode et al. |
| 2006/0243133 A1 | | 11/2006 | Hart et al. |
| 2006/0243184 A1 | | 11/2006 | O'Rear |
| 2006/0243859 A1 | | 11/2006 | Lessi et al. |
| 2006/0243950 A1 | | 11/2006 | O'Rear |
| 2007/0000380 A1 | | 1/2007 | Leigh et al. |
| 2007/0023577 A1 | | 2/2007 | Jones |
| 2007/0054610 A1 | | 3/2007 | Jensen |
| 2007/0062371 A1 | | 3/2007 | Eilers |
| 2007/0144347 A1 | | 6/2007 | Snow |
| 2007/0157803 A1 | | 7/2007 | McNeil et al. |
| 2007/0209509 A1 | | 9/2007 | Zaki et al. |
| 2007/0261554 A1 | | 11/2007 | Jensvold |
| 2008/0060523 A1 | | 3/2008 | Tom et al. |
| 2008/0245370 A1 | | 10/2008 | Kobziar et al. |
| 2009/0071340 A1 | | 3/2009 | Surawski |
| 2009/0205661 A1 | | 8/2009 | Stephenson et al. |
| 2009/0320836 A1 | | 12/2009 | Baker, Jr. |
| 2010/0024649 A1 | | 2/2010 | Semmere et al. |
| 2010/0064886 A1 | | 3/2010 | Surawski et al. |
| 2011/0000490 A1 | | 1/2011 | Gillotin et al. |
| 2013/0042870 A1 | | 2/2013 | Peacey et al. |
| 2013/0312744 A1 | | 11/2013 | Kshirsagar et al. |
| 2016/0304209 A1 | * | 10/2016 | Zug ........................ B64D 13/08 |

FOREIGN PATENT DOCUMENTS

| | | |
|---|---|---|
| GB | 2255509 A | 11/1992 |
| WO | 2006079782 A2 | 8/2006 |

OTHER PUBLICATIONS

Honeywell, On-Board Inert Gas Generation System (OBIGGS), website, Sep. 13, 2011, 1 page.
Honeywell, On-Board Inert Oxygen Generating System (OBOGS), website, Sep. 13, 2011, 1 page.
EPO, International Search Report and Written Opinion from International Application PCT/US2013/041710 dated Sep. 30, 2013.
EPO, International Search Report and Written Opinion from International Application PCT/US2013/041245 dated Dec. 4, 2013.
Intertechnique EROS, OBOG System, website, Sep. 22, 2011, 2 pages.

(56) References Cited

OTHER PUBLICATIONS

Chinese Search Report, 3 pages, from App. No. 2013800270201.

\* cited by examiner

HYBRID ON-BOARD GENERATION OF OXYGEN FOR AIRCRAFT PASSENGERS

CROSS-REFERENCE TO RELATED APPLICATION

This application is a continuation based upon U.S. Ser. No. 13/483,345, filed May 30, 2012, which is a continuation-in-part of U.S. Ser. No. 13/481,057, filed May 25, 2012, the entire contents of which are incorporated herein by reference.

BACKGROUND

This invention generally relates to a system and method for providing regulated flow of oxygen, including for flight crew or passengers on-board an aircraft. The invention more particularly relates to a system and method for ensuring that oxygen gas suitable for breathing is promptly and intermittently available to flight crew or passengers on-board an aircraft including during an aircraft's descent. Components of the system include oxygen generators and a heat exchanger interface for transferring heat from the exothermic decomposition reactions of a first oxygen generator to a second heat-dependent oxygen generator.

Conventional systems and methods for supplying oxygen to aircraft passengers typically rely upon gaseous oxygen that is either chemically generated in a passenger service unit (PSU) located above a passenger seat, or dispensed from pressurized gaseous cylinders, typically either through a centralized distribution network on the aircraft or from a plurality of separate individualized gaseous cylinders.

When the emergency oxygen is to be supplied to a face mask, a constant flow of oxygen is typically received by a reservoir bag attached to the face mask. The oxygen is commonly supplied continuously at a rate that is calculated to accommodate even the needs of a passenger with a significantly larger than average tidal volume who is breathing at a faster than average respiration rate. The continuing flow of oxygen into the reservoir bag and into the mask is typically diluted by cabin air.

Chemically generated oxygen systems are provided as single use devices that once activated can only be used once and must be replaced for future use. Chemically generated oxygen systems are generally suitable for shorter duration flights, under 22 minutes. However, the terrain of the flight path is also a determining factor in the suitability of chemically generated oxygen systems to meet oxygen demands. For longer duration flights and flights subject to variable or challenging terrain, gaseous oxygen can be stored in cylinders. Oxygen from pressurized cylinders of gas may be distributed from one or more sources within a distribution network of an aircraft, or individual cylinders may be provided for each passenger or crew member. In either case, given the limited space of an aircraft, oxygen from the cylinders is typically not far from components of the aircraft's illumination system increasing the hazard potential. For example, individual cylinders or outlets of a distribution network above the seats are near the lights. The extensive plumbing required throughout the aircraft to incorporate these pressurized oxygen cylinders as part of the on-board oxygen supply system for oxygen distribution to passengers must be periodically leak checked, which increases maintenance costs. Pressurized oxygen cylinders also have to be sufficiently strong so as to prevent burst hazards, which leads to increased weight, and consequently increased fuel consumption and fuel cost.

Enhancing the efficiency of such aircraft emergency oxygen supply systems either in terms of the generation, storage, distribution or consumption of oxygen could therefore yield a weight savings. Conversely, an enhancement of an aircraft emergency oxygen supply system's efficiency without a commensurate downsizing would impart a larger margin of safety in the system's operation. It is therefore highly desirable to enhance the efficiency of an emergency or supplemental oxygen supply system in any way possible.

The delivered supplemental oxygen flow rate needed to properly oxygenate an aircraft cabin occupant depends on the prevailing atmospheric pressure at a given altitude. The quantity and rate of flow of oxygen delivered to a user can advantageously be varied as a function of altitude, to provide proper oxygenation, while avoiding an inefficient and wasteful delivery of a greater quantity of oxygen than is required.

A molecular sieve oxygen generating system (MSOG) is also known that generates a supply of oxygen or an oxygen enriched gas and a residual gas from a supply gas. Such molecular sieve oxygen generator type of on-board oxygen generator devices rely on pressure swing adsorption (PSA) technology to produce an oxygen enriched gas comprising up to 95% oxygen with a residual gas stream that can contain greater than about 9% oxygen. However, this system has limited applicability for meeting aircraft passenger demands for oxygen in the initial stages of operation, which may be required immediately at high altitudes. Further, this system does not minimize consumption of oxygen or conserve oxygen.

Pressure swing adsorption technology, incorporated in molecular sieve oxygen generating systems, is based on the principle that gases under pressure are generally attracted to solid surfaces upon which the gases are adsorbed. Higher pressure results in greater gas adsorption. When the pressure is reduced or swings from high to low, gas is released or desorbed. Gaseous mixtures may be separated through pressure swing adsorption because different gases tend to be adsorbed or attracted to different solid materials to varying degrees.

Accordingly, when the pressure is reduced gases that are less strongly attracted to the solid materials will be desorbed first to form an outlet stream. After the bed of solid material to which gases are adsorbed reaches its capacity to adsorb, pressure is further reduced to release more strongly attracted gases. As applied to an on-board oxygen generator (OBOG), engine bleed air is typically fed into the pressure swing adsorption device, the nitrogen component of air is adsorbed to a bed of solid material more strongly than the oxygen component of air, and a gaseous outlet stream enriched with oxygen is produced.

Adsorbents for pressure swing adsorption systems must have the ability to discriminate between two or more gases demonstrating selective adsorption. Suitable adsorbent materials for pressure swing adsorption systems are usually very porous materials selected for their large surface areas, for example activated carbon, silica gel, alumina and zeolites. The gas adsorbed on these surfaces may consist of a layer that is only one or at most a few molecules thick. Adsorbent materials having surface areas of several hundred square meters per gram enable the adsorption of a significant portion of the adsorbent's weight in gas. The molecular sieve characteristics of zeolites and some types of activated carbon called carbon molecular sieves serve to exclude some gas molecules based on size, in addition to the differential adsorption selectivity for different gases.

Another system is known that utilizes molecular sieve bed and/or permeable membrane technology, to produce first, oxygen for use for breathing by an aircrew, and second, nitrogen for use as an inert environment in the fuel tanks of an aircraft. However such systems still require the provision of compressors for both the oxygen, in order that the oxygen can be delivered at an appropriate pressure for breathing, and for the nitrogen. Also, the concentration of oxygen which can be produced is restricted by virtue of the nature of the conventional on-board oxygen generator device technology which is used. Due to the high temperature requirement there is a time lag before full oxygen capacity can be utilized.

Another type of on-board oxygen generator is a ceramic oxygen generator (COG), which utilizes solid electrolyte oxygen separation (SEOS) technology in which oxygen is catalytically separated from air inside specialized ceramic materials at high temperatures, about 650° C. to 750° C., typically using electrical voltage to supply the heat required. While this process can produce substantially pure oxygen gas product at pressure suitable for breathing at any altitude, including higher altitudes over 30,000 feet, the oxygen is not promptly available upon powering on of the device because the device has to reach the required operating temperature first.

While ceramic oxygen generator devices typically are superior to molecular sieve oxygen generator devices based on an ability to provide purer or more highly concentrated oxygen-enriched gas at pressures suitable for breathing, oxygen from ceramic oxygen generator devices is also not promptly available due to the high temperature requirement necessary for oxygen generation from such devices.

When an emergency situation arises on-board an aircraft, oxygen that is promptly available at a concentration, temperature, and pressure suitable for breathing is needed. At high altitudes, greater than 30,000 feet, 99% purity or higher oxygen gas is required. At lower altitudes, equal to or less than 30,000 feet, oxygen gas that is 90-95% oxygen may be suitable. An emergency situation may include sudden cabin decompression, sudden descent, and the like.

It would be desirable to provide a system that utilizes the advantages of ceramic oxygen generator devices incorporating solid electrolyte oxygen separation technology without sacrificing availability of breathable oxygen gas in the short-term during descent or upon an emergency situation arising by integrating ceramic oxygen generator devices with other sources that provide oxygen in the short-term. Ideally, such a system would also conserve oxygen and maximize efficiency of oxygen usage.

It would further be desirable to conserve oxygen that is available or generated by providing oxygen to the masks of passengers or crew intermittently, utilizing a feedback mechanism such that oxygen is provided as needed with a margin allowed for safety.

Finally, it would be highly desirable to reduce the wait time required for the supply of oxygen from ceramic oxygen generator systems incorporating solid electrolyte oxygen separation technology by heating the ceramic membranes upon which these systems rely more rapidly. The present invention meets these and other needs.

SUMMARY OF THE INVENTION

Briefly, and in general terms, the present invention provides a hybrid system for the on-board generation of oxygen for aircraft passengers and a method that incorporates the hybrid system. More specifically, the hybrid system heats the ceramic membranes of a ceramic oxygen generator by harvesting heat from the exothermic decomposition reactions occurring in a chemical oxygen generator. The oxygen generating system is hybrid in that it incorporates two different types of oxygen generators, the chemical oxygen generator and the ceramic oxygen generator, leveraging the inherent thermodynamics of one system to benefit the other. Excess heat given off by the reactions of the chemical oxygen generator can be delivered to the ceramic oxygen generator through a heat exchange interface between the two generators. Heat from the chemical oxygen generator makes using the ceramic oxygen generator more practical because it heats up faster, making it ready to use in a shorter time frame, and it costs less to heat it.

Oxygen supplied from the chemical oxygen generator can be delivered to passengers in a first stage upon an emergency situation arising and during an initial descent mode of an aircraft. Oxygen supplied from the ceramic oxygen generator can be delivered to passengers in a second stage once ceramic oxygen generator has reached operational temperature more rapidly than otherwise due to the assistance of heat produced via the exothermic chemical decomposition reactions in the chemical oxygen generator. A plurality of each type of generator, the chemical oxygen generator and the ceramic oxygen generator, may be provided as necessary to meet passenger demands with an adequate margin for safety. Oxygen enriched gas suitable for breathing produced from either type of generator can be promptly and intermittently delivered to passengers through at least one regulator that regulates interaction among the subsystems and maximizes efficiency of oxygen usage based in part on passenger breathing patterns and oxygen needs.

According to one aspect of the present invention, the system is designed to meet the needs of the flight crew and the passengers of an aircraft, including during both emergency and initial descent and holding altitude modes. According to various aspects of the present invention as disclosed herein, the high operating temperature limitation of the solid electrolyte oxygen separator is overcome by providing oxygen from another generator, a chemical oxygen generator, as promptly as necessary while the ceramic oxygen generator or solid electrolyte oxygen separator is heated. For example, upon an emergency situation or cabin decompression arising, within ten (10) seconds sufficient oxygen in the amount of 3.3 liters/minute (L/min) must be supplied to aircraft passengers to avoid hypoxia.

The hybrid on-board oxygen generation system of the invention accelerates attainment of the required operating temperature for the ceramic oxygen generator or solid electrolyte oxygen separator (SEOS), thereby reducing the time until the solid electrolyte oxygen separator component of the system is available to takeover supplying oxygen while at the same time providing chemically generated oxygen in the interim. More specifically, heat generated from the exothermic chemical decomposition reactions of the chemical oxygen generator can be harnessed from the hot oxygen as it escapes from the oxygen generating container and hot chemical core of the chemical oxygen generator. The harnessed heat is then fed to the ceramic oxygen generator or solid electrolyte oxygen separator to accelerate heating of the membranes used for oxygen separation. To achieve these objectives, the heat generated from exothermic chemical decomposition reactions inherent in chemical oxygen generators is harvested and used to heat the ceramic membranes of the ceramic oxygen generator system.

Chemical oxygen generators are usually mechanically ignited by a firing pin. Explosives in the percussion cap of the generator may include lead styphnate and a tetrazene mixture. The chemical oxygen generator generally relies upon an inorganic superoxide, alkali metal chlorate, alkali metal perchlorate, and/or mixtures thereof as the oxygen source. Ozonides are another promising group of oxygen sources for chemical oxygen generators. By way of example, the decomposition reaction may involve an oxidizer core of solid sodium chlorate ($NaClO_3$), mixed with less than 5 percent calcium hydroxide ($Ca(OH)_2$) and less than 1 percent potassium perchlorate ($KClO_4$), decomposing into solid sodium chloride (NaCl) and oxygen gas ($O_2$). This is the decomposition reaction responsible for chemical oxygen generation in typical commercial aircraft and it produces about 3.5 liters (L) of oxygen and 4,220 calories of heat for every 10 grams of sodium chloride at ambient conditions. The exterior temperature of the canister will usually reach 260° C. and it will produce oxygen for 15 to 20 minutes.

The actual amount of heat available for harvesting can be further increased by incorporating a metal powder as a fuel or catalyst for the sodium chlorate (or other) decomposition reaction. Upon oxidation, such metal powder generates the heat needed to initiate sodium chlorate (or other) decomposition. The oxygen generating compositions of the invention typically includes about 0.5-15% by weight of a metal powder to supply the heat to sustain the decomposition of the oxygen source such as tin powder or iron powder, or a combination of the two powders, although other metal powders such as titanium, copper, aluminum, magnesium, and combinations thereof may also be suitable.

In accordance with the various aspects of the present invention, almost any chemical oxygen generator that includes an exothermic reaction can be utilized for heat harvesting to prepare the solid electrolyte oxygen separation based system. Typically, an alkali metal chlorate, alkali metal perchlorate, and/or mixtures thereof is used as the oxygen source. For example, sodium perchlorate ($NaClO_4$) or lithium perchlorate ($LiClO_4$) may be used instead of sodium chloride.

The ability to harvest, or harness, heat from chemical oxygen generators that rely upon exothermic chemical decomposition reactions for more quickly heating the typically ceramic membranes of the solid electrolyte oxygen separation system makes use of the solid electrolyte oxygen separation system more reliable and practical and at a lesser cost with reduced wait time. Accordingly, the solid electrolyte oxygen separation system with its ceramic oxygen generators becomes a more viable alternative to traditional bulky pressurized oxygen cylinders.

A further advantage of a promptly available solid electrolyte oxygen separator is reduced reliance on the bulky pressurized oxygen cylinders (typically at 1850 to 3000 psig) generally required for longer duration flights, typically flights over twenty two (22) minutes.

The present invention accordingly provides for a hybrid system for providing supplemental oxygen for breathing by crew or passengers of an aircraft. The hybrid system includes an on-board oxygen generator that requires heating to reach an operational temperature, and a chemical oxygen generator configured to produce oxygen and heat. The chemical oxygen generator is in thermal communication with the on-board oxygen generator, so that heat produced by the chemical oxygen generator is supplied to the on-board oxygen generator to expedite attainment of an operational temperature of the on-board oxygen generator. In a presently preferred aspect, the on-board oxygen generator includes a solid electrolyte oxygen separator having at least one membrane configured to receive heat from the chemical oxygen generator. The solid electrolyte oxygen separator can be a ceramic oxygen generator, and the at least one membrane can be a ceramic membrane, for example. In another presently preferred aspect, a heat exchange interface is disposed between the on-board oxygen generator and the chemical oxygen generator to provide the thermal communication between the chemical oxygen generator and the on-board oxygen generator. In another presently preferred aspect, the chemical oxygen generator includes a chemical oxygen generating composition that at least partially covers and is in direct thermal contact with the heat exchange interface. In another presently preferred aspect, the hybrid system includes one or more breathing masks connected in a communicating relationship with the chemical oxygen generator and the on-board oxygen generator and configured to receive oxygen from at least one of the chemical oxygen generator and the on-board oxygen generator, and a pulsed oxygen delivery subsystem connected to both the chemical oxygen generator and the on-board oxygen generator and configured to regulate a flow of oxygen to the one or more breathing masks based on a sensed breathing pattern. In another presently preferred aspect, the hybrid system includes a controller configured to control the on-board oxygen generator and the chemical oxygen generator.

In another aspect, the hybrid system for providing supplemental oxygen for breathing for crew or passengers of an aircraft includes a first on-board oxygen generator configured to supply oxygen in an initial stage, and a second on-board oxygen generator configured to generate oxygen on-board an aircraft in a subsequent stage. The first on-board oxygen generator includes a chemical oxygen generator configured to produce heat through exothermic chemical decomposition reactions, and the second on-board oxygen generator includes a solid electrolyte oxygen separator configured to catalytically separate oxygen from a supply stream of air at a temperature of 650° C. to 750° C., with heat that can be supplied over an extended period of time by electrical heating. The second on-board oxygen generator is advantageously thermally connected to the first on-board oxygen generator so that heat produced in the exothermic chemical decomposition reactions of the chemical oxygen generator can be supplied to the second on-board oxygen generator to increase a rate at which the supply stream of air initially reaches an operating temperature of 650° C. to 750° C. A controller is configured to control the first on-board oxygen generator and the second on-board oxygen generator.

In a presently preferred aspect, the first on-board oxygen generator is configured to supply oxygen at a pressure suitable for breathing at high altitudes greater than 30,000 feet. In another presently preferred aspect, the solid electrolyte oxygen separator includes a ceramic material configured to catalytically separate oxygen from the supply stream of air. In another presently preferred aspect, the hybrid system includes one or more breathing masks in a communicating relationship with the first on-board oxygen generator and the second on-board oxygen generator, whereby the one or more breathing masks are configured to receive oxygen from at least one of the first on-board oxygen generator and the second on-board oxygen generator. A pulsed oxygen delivery subsystem is preferably connected to both the first on-board oxygen generator and the second on-board oxygen generator, and is configured to regulate flow of oxygen to the breathing mask based on a sensed breathing pattern.

The present invention also provides for a method for providing regulated flow of oxygen, including for flight crew or passengers on-board an aircraft. The method initially involves activating a first system to initiate rapid flow of oxygen from a first on-board oxygen generator at high altitudes greater than 30,000 feet. The first system includes a chemical oxygen generator configured to produce oxygen through an exothermic decomposition reaction of at least one constituent, and heat from the exothermic decomposition reaction of the first system is supplied to a second system including a second on-board oxygen generator having a solid electrolyte oxygen separator with at least one ceramic membrane and configured to catalytically separate oxygen from a supply stream of air at a temperature of 650° C. to 750° C. by applying an electrical voltage. The second system is activated to initiate flow of oxygen from the second on-board oxygen generator after the second system has reached operational temperature of 650° C. to 750° C. Oxygen supplied from the second system is integrated with oxygen supplied from the first system, and the first system is deactivated when the second system is able to meet oxygen demands. One or more breathing patterns of one or more passengers or flight crew members are sensed, and the flow of oxygen to one or more breathing masks of the one or more passengers or flight crew is regulated by delivering oxygen to the mask from the first system or the second system through a pulsed oxygen supplier configured to vary a flow rate of oxygen, based on the one or more sensed breathing patterns. In another presently preferred aspect, the second on-board oxygen generator of the second system is configured to supply highly enriched oxygen at pressure suitable for breathing at altitudes less than or equal to 30,000 feet.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENTS

Ceramic oxygen generator (COG) systems utilize solid electrolyte oxygen separation (SEOS) technology in which oxygen is catalytically separated from air inside specialized ceramic materials at high temperatures, about 650° C. to 750° C., using electrical voltage. While this process produces substantially pure oxygen gas product at pressure and suitable for breathing at any altitude, including higher altitudes over 30,000 feet, the drawback is that the oxygen is not promptly available upon powering on the device because the device has to reach the high required operating temperature first. Due to the high operational temperature requirement, there is typically a time lag before full oxygen capacity from a ceramic oxygen generator or solid electrolyte oxygen separator can be fully utilized.

Provided herein is a hybrid system and method for generating, supplying and maintaining adequate reserves of oxygen. One preferred application for the present invention is to provide oxygen for passengers and flight crew on-board an aircraft including at high altitudes above 30,000 feet, during descent, and at holding altitudes at or below 30,000 feet, on flight paths over variable terrain, and on flights of any duration. The present invention offers several advantages for providing oxygen to passengers and crew on both business jets and commercial aircrafts.

Maintaining adequate reserves of oxygen may be accomplished by storing excess oxygen generated for future use through refilling emergency reserves. Conservation of available oxygen by more closely matching oxygen supplied from the system to oxygen demand by passengers and crew also assists with maintenance of adequate reserves.

Figure 1:
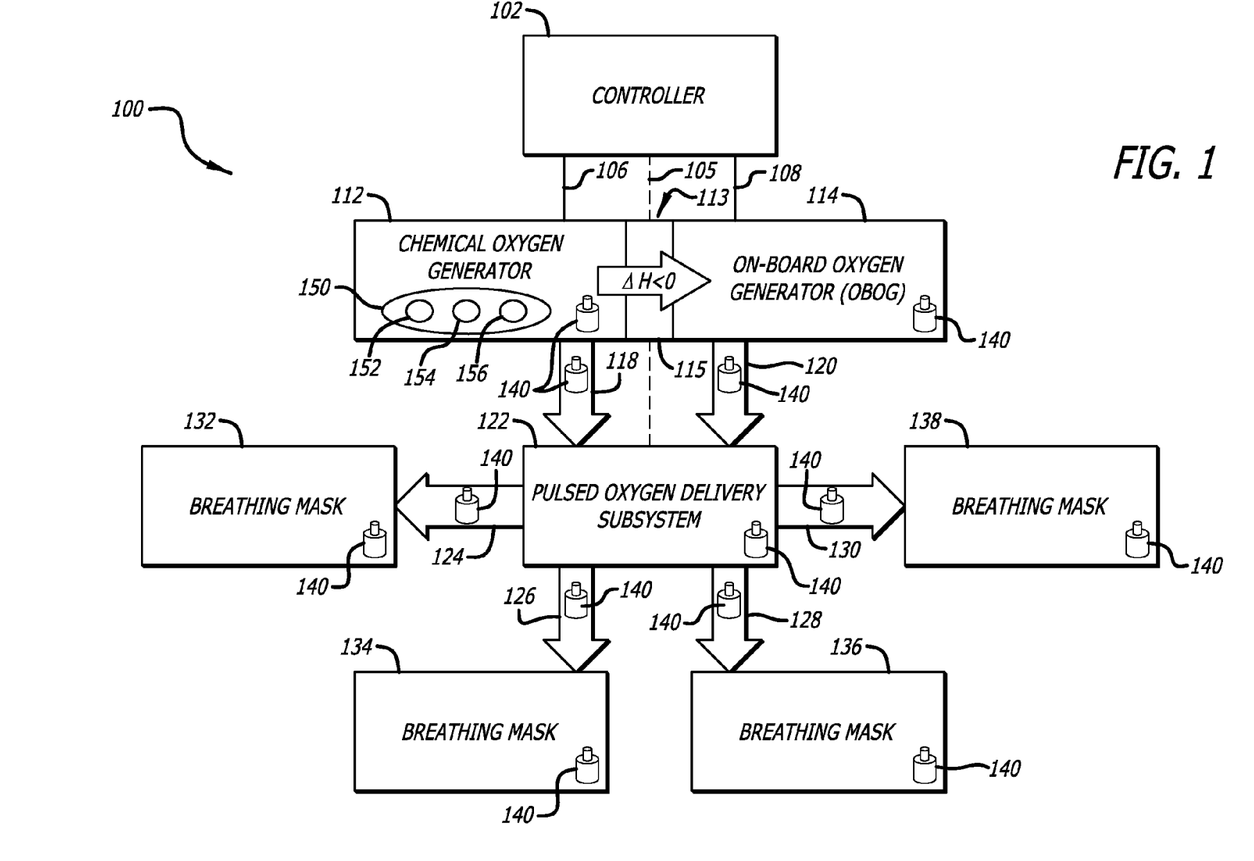
FIG. 1 is a schematic diagram of a first embodiment of a system for providing regulated flow of oxygen, including for flight crew or passengers on-board an aircraft.

Accordingly, as is shown in FIG. 1, which is provided for purposes of illustration by way of example, and not by way of limitation, the present invention provides for a system for providing regulated flow of oxygen rapidly and intermittently as needed, in aircraft. Referring to FIG. 1, in a first presently preferred embodiment, the system 100 for providing regulated flow of oxygen rapidly and intermittently as needed, in aircraft, includes a controller or control system 102 in electronic communication with a chemical oxygen generator 112 through line 106. The controller is also in electronic communication with a pulsed oxygen delivery subsystem 122 through line 105. Additionally, the controller is in electronic communication with an on-board oxygen generator 114 of the ceramic oxygen generator (COG) or solid electrolyte oxygen separator (SEOS) type through line 108. The chemical oxygen generator 112 is in thermal communication 113 with the on-board oxygen generator 114. Thermal communication may be achieved through any feasible means known in the art. The zone of thermal communication may include a heat exchange interface 115 so that heat generated through the exothermic chemical decomposition reactions of the chemical oxygen source constituents 150 (e.g. sodium chlorate 152, sodium perchlorate 154, lithium perchlorate 156, and the like) can thereby be harnessed and delivered to the on-board oxygen generator 114 to heat the ceramic membranes and accelerate attainment of operational temperature, 650° C. to 750° C. Typically, an alkali metal chlorate, alkali metal perchlorate, and/or mixtures thereof can be used as the oxygen source. The oxygen generating compositions of the invention can also include about 0.5-15% by weight of a metal powder such as tin powder or iron powder, or a combination of the two powders, for example, to supply the heat to sustain the decomposition of the oxygen source, although other metal powders such as titanium, copper, aluminum, magnesium, and combinations thereof may also be suitable.

The decomposition reaction of the chemical oxygen generator typically produces at least about 3.5 liters (L) of oxygen and 4,220 calories of heat for every 10 grams of sodium chloride at ambient conditions, although the heat produced is typically larger due to the action of additional ingredients such as metal powders that upon oxidation facilitate the decomposition reaction of the chemical oxygen generator constituents.

Continuing with reference to FIG. 1, the chemical oxygen generator 112 is in fluid communication with the pulsed oxygen delivery subsystem 122 through feed line 118. The on-board oxygen generator 114 is also in fluid communication with the pulsed oxygen delivery subsystem 122 through feed line 120. The pulsed oxygen delivery subsystem 122, in turn, is in fluid communication with one or more breathing masks 132, 134, 136, and 138 which can be provided for passengers and crew members through low pressure tubing 124, 126, 128, and 130. Optionally, one or more sensors 140 or detectors in electronic communication with the controller and/or the pulsed oxygen delivery subsystem may be provided in any of the breathing masks, the pulsed oxygen delivery subsystem, the oxygen sources, or along the feed lines or low pressure tubing through which oxygen is supplied for sensing air pressure and/or flow and communicating a corresponding sensor signal indicating air pressure and/or flow to the controller, as will be further explained below.

With regard to FIG. 1, different types of sensors or detectors may be provided for each of the oxygen sources, the feed lines, the pulsed oxygen delivery subsystem, and in the breathing masks. As used herein, reference numeral 140 refers generally and broadly to any type of sensor or detector in any of these locations and need not be the same across the various locations. For example, the sensors or detectors represented by reference numeral 140 may be for measuring pressure, flow rate, temperature, volume, concentration of constituent gases in a gaseous mixture, oxygen usage rates, and the like.

Figure 2:
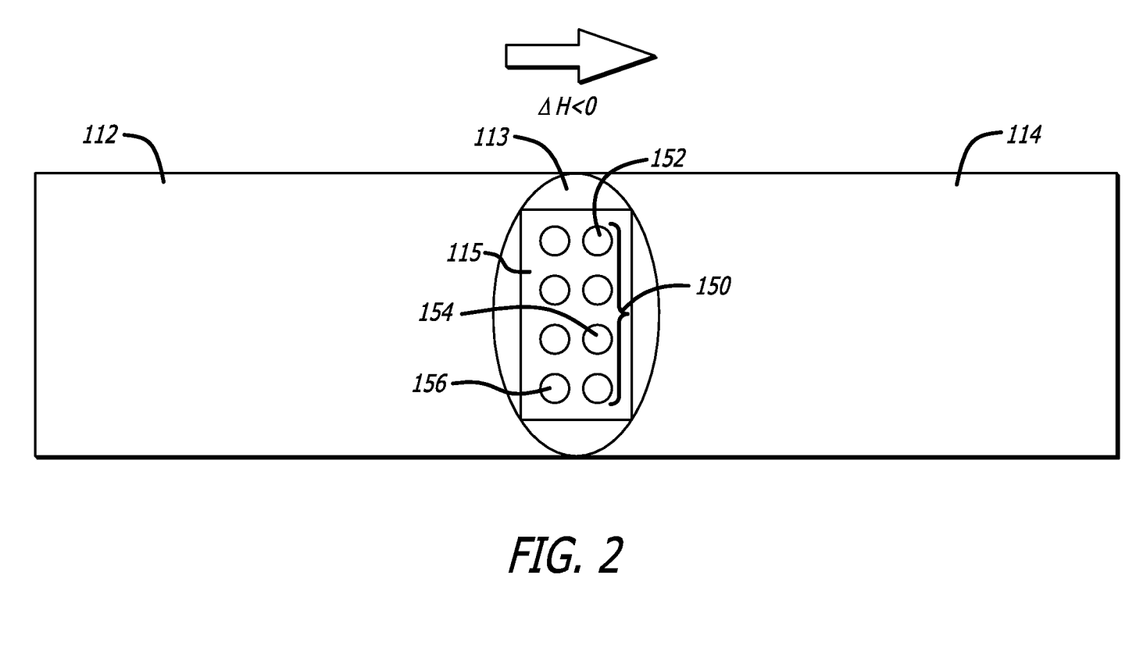
FIG. 2 is schematic diagram of an enlarged portion of the system of FIG. 1 for heating an on-board oxygen generator with a chemical oxygen generator.

Referring to FIG. 2, in addition to the zone of thermal communication 113 between the chemical oxygen generator 112 and the on-board oxygen generator 114 so that heat from the chemical oxygen generator can be used to heat the on-board oxygen generator, other elements to effectuate this transfer of heat can also be provided. For example, the heat exchange interface 115 may be provided within the zone of thermal communication, as part of the chemical oxygen generator or as a separate element of the system between the chemical oxygen generator and the heat-dependent on-board oxygen generator. The chemical constituents of the chemical oxygen generator responsible for the exothermic decomposition reactions may be combined into a distributed oxygen generating formulation to cover the interface 115 and thereby more effectively transfer heat. For example, the chemical constituents (e.g. sodium chlorate) that decompose to give off heat and the metal powders (e.g. iron oxide) that catalyze or enhance this process may be coated in an array or scattered in a random pattern across the heat exchange interface. The heat exchange interface may include a filter through which the heat given off upon decomposition can be harnessed for delivery to the heat-dependent solid electrolyte oxygen separator type of on-board oxygen generator (OBOG). The chemical oxygen generator 112 typically also includes one or more accompanying igniters or sequencers or a chemical oxygen generator initiation device (not shown).

The on-board oxygen generator (OBOG) 114 preferably includes a solid electrolyte oxygen separator (SEOS). One example of this solid electrolyte oxygen separator is a ceramic oxygen generator device. The ceramic oxygen generator type of device provides the advantages of producing highly enriched oxygen gas (substantially 100% $O_2$) at pressure suitable for breathing, thereby reducing or eliminating the need for compressors which take up space and add weight.

Figure 3:
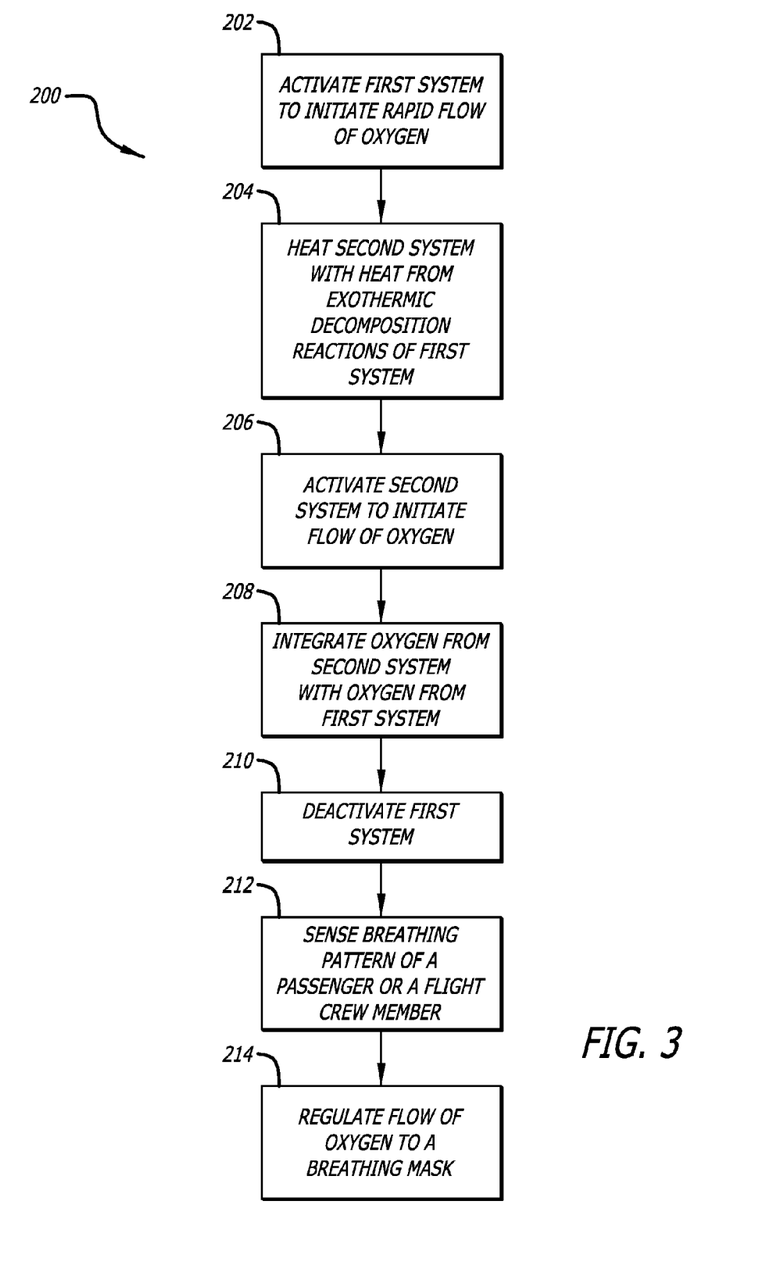
FIG. 3 is a flow chart illustrating a method for providing regulated flow of oxygen, including for flight crew or passengers on-board an aircraft, in accordance with an embodiment of the present invention.

Referring to FIG. 3, the steps of a method 200 in accordance with an embodiment of the present invention are illustrated. A method for providing regulated flow of oxygen, including for flight crew or passengers on-board an aircraft, includes the step 202 of activating a first system to initiate rapid flow of oxygen from a first on-board oxygen supplier, a chemical oxygen generator, typically at high altitudes greater than 30,000 feet. Then, heat from the exothermic decomposition reaction of the first system is supplied to a second system including an on-board oxygen generator having a solid electrolyte oxygen separator at step 204. At step 206, the second system is activated to initiate flow of oxygen from an on-board oxygen generator after the second system has reached operational temperature of 650° C. to 750° C. Highly enriched oxygen gas from the second system is integrated with oxygen supplied from the first system at step 208 to supply oxygen for breathing at altitudes typically of 30,000 feet or lower. Subsequently, at step 210 the first system can be deactivated when the second system is able to meet oxygen demands. At step 212, a breathing pattern of a passenger or a flight crew member is sensed, and at step 214 the flow of oxygen to a breathing mask of a passenger or a flight crew member is regulated by delivering oxygen to the mask from the first system or the second system through a pulsed oxygen supplier configured to vary a flow rate of oxygen based on a sensed breathing pattern and/or physiological requirements.

During an initial stage, for example immediately after an emergency situation arises, a stream of gas highly enriched with oxygen is provided from the first on-board oxygen supplier (e.g. the chemical oxygen generator). The initial stage typically exists when the aircraft is at an altitude greater than 30,000 feet. An emergency signal may be used to initiate flow during the first stage which lasts around three to seven minutes before oxygen from the heat-dependent on-board generator is available. In a subsequent stage, oxygen is supplied from a second on-board oxygen supplier, the on-board oxygen generator. The second on-board oxygen supplier includes an on-board oxygen generator that produces oxygen enriched gas on-board the aircraft. The subsequent stage typically exists after the aircraft has completed an initial descent and reached a holding altitude. However, when the on-board generator is of the ceramic oxygen generator type, given the high purity of the oxygen gas produced thereby, it is suitable for breathing at altitudes over 30,000 feet as well. After the initial three to seven minute heating period during which the chemical oxygen generator is the sole oxygen supplier the on-board generator is generally ready to takeover.

The on-board oxygen generator may be a ceramic oxygen generator. Ceramic membranes for separating oxygen from a supply stream of air rely on the catalytic properties of the interior surfaces of specialized ceramic materials to ionize and then separate oxygen. As applied on aircrafts, the supply stream of air for the ceramic oxygen generator type on-board oxygen generator device is typically engine bleed air. However, the supply gas for the ceramic oxygen generator type on-board oxygen generator device may come from other sources. For example, the supply gas may come from the product stream of another on-board oxygen generator device positioned upstream, including a ceramic oxygen generator or molecular sieve oxygen generator (MSOG).

The oxygen ionization process at high surface temperatures is partly responsible for generation of a product gas from the ceramic membrane systems that is virtually 100% pure oxygen with no possibility for the presence of biological or toxic chemical components. Ceramic operating temperatures are around 700° C. and the electrical potential difference across the membrane is on the order of a volt. Ceramic membrane oxygen generators are one preferred subset of ion transport membrane (ITM) technologies.

The highly enriched oxygen gas produced by the ceramic oxygen generator device is suitable for breathing at higher altitudes above 30,000 feet whereas more moderately enriched oxygen gas produced by other types of on-board oxygen generator devices, including molecular sieve oxygen generator devices, is not suitable for breathing at higher altitudes and requires compressors to pressurize it before it is suitable for breathing at lower altitudes. Highly enriched oxygen gas from the ceramic oxygen generator device may be used directly for breathing at any altitude after waiting for attainment of the high temperature requirement necessary to the production of such gas.

The standby availability of the ceramic oxygen generator device on-board the aircraft reduces reliance on pressurized gas cylinders and chemical oxygen generators. Smaller pressurized gas cylinders, or none at all, may be provided if ceramic oxygen generator type on-board oxygen generator devices are available. Additionally, the excess oxygen generated by the ceramic oxygen generator devices might be used to refill the smaller pressurized cylinders in the air, thereby reducing maintenance costs from refilling or replacing pressurized gaseous cylinders on the ground.

By incorporating this ceramic oxygen generator device and existing solid electrolyte oxygen separation technology as a component in a system with other components that can supply oxygen sooner and managing the supply of oxygen among the components, the present invention overcomes the drawback of delays encountered with ceramic oxygen generator and solid electrolyte oxygen separation devices. Embodiments of the present invention also overcome the delay drawback by expediting the heating process to reduce the time required for the ceramic oxygen generator devices to reach operational temperature.

For example, chemical oxygen generators that produce highly oxygen enriched gas (about 99% oxygen and above) may supply oxygen for about the first three to seven minutes upon an emergency situation arising. After the first three to seven minutes it is likely that the on-board oxygen generator will have attained operating temperature (650-750° C.) and sufficiently cycled to be able to take over as the oxygen supply.

The controller may be used to coordinate the supply of oxygen from the various sources to the one or more pulsed oxygen suppliers (not shown) of the pulsed oxygen delivery subsystem that feed one or more individual breathing masks. The controller is able to determine what quality of oxygen is required based on altitude and what sources of oxygen are available. The controller manages the oxygen supplies as necessary to meet the demands of passengers and crew while maintaining adequate reserves.

For example, upon an emergency situation arising at high altitude greater than 30,000 feet, if oxygen from a ceramic oxygen generator device is not promptly available because the ceramic oxygen generator device was not turned on until the emergency situation arose, the controller can direct a chemical oxygen generator to promptly supply oxygen. Upon the ceramic oxygen generator device attaining operation temperature of 650° C. to 750° C. and cycling, the controller can sense the presence of highly enriched oxygen available from the ceramic oxygen generator device, infiltrate this into the supply stream from the chemical oxygen generator, and phase out supply from the chemical oxygen generator once the ceramic oxygen generator type on-board oxygen generator device is able to adequately meet demand.

One way in which the system may provide regulated flow of oxygen rapidly and intermittently, as needed in aircraft, is through the pulsed oxygen delivery subsystem, which can conserve oxygen, such as by regulating oxygen flow to the breathing mask of a passenger or a flight crew member during an exhalation phase of the breathing cycle and resuming flow of oxygen to the breathing mask during an inhalation phase.

For example, one or more sensors 140 may be provided in fluid communication with each breathing mask for detecting an inhalation phase or an exhalation phase of a breathing cycle of a passenger or a flight crew member and then communicating this information to the controller. The controller, in turn, directs the pulsed oxygen delivery subsystem and the oxygen sources accordingly to conserve, decrease, stop, increase, or resume the flow of oxygen as needed to better manage oxygen supplies while meeting the demands of passengers and flight crew members.

Other components may be incorporated in different embodiments but are not required. For example, these other components may be a main cabin decompression relay, one or more additional relays, an electrically operated on/off inlet valve between each oxygen source and each of the feed lines from the oxygen source to each breathing mask, one or more pressure transducers, and the like.

Other components of the system may also include cooling or heating devices, for example along the feed lines, to ensure enriched oxygen gas from the oxygen generators (especially the very high temperature ceramic oxygen generator device) is supplied to the breathing masks of passengers or cabin flight crew at the appropriate temperature compatible with physiological preferences or requirements. Cooling devices for cooling the oxygen enriched gas from the chemical oxygen generator may be configured to perform dual functions, also harnessing the heat removed from the product oxygen stream for redirecting to heat the solid electrolyte oxygen separator so that it attains operational temperature more rapidly than otherwise and at lower heating cost. Cooling or heating devices, for example along the feed lines, may also be provided to ensure inert gas is delivered to the fuel tank at the appropriate temperature in embodiments that include this feature.

Additionally, the pulsed oxygen delivery subsystem 122 may include one or more pulsed oxygen suppliers (not shown) for intermittently providing flow of oxygen to the individual breathing masks. The breathing masks may each include a reservoir bag. The pulsed oxygen suppliers may be utilized to further distribute and regulate supply of oxygen to passengers throughout the aircraft.

In alternative embodiments, as part of the control system, in addition to the controller, one or more sensors 140 or detectors at each of the oxygen sources may be provided to determine volume available and oxygen concentration. Another sensor or detector (not shown) in a communicating relationship with the controller may read altitude. Additional sensors 140 and detectors may be provided within individual breathing masks, within the pulsed oxygen delivery subsystem, or along any of the lines to or from the breathing masks or the pulsed oxygen delivery subsystem to monitor other variables including oxygen usage rates.

In still other embodiments, the controller may be in electrical communication with each oxygen source and a main cabin decompression relay (not shown). More specifically, the controller may be in communication with an electrically operated on/off inlet solenoid valve (not shown) between each oxygen source and each breathing mask, or between each oxygen source and the pulsed oxygen delivery subsystem supplying oxygen to the masks, or between the pulsed oxygen delivery subsystem and each mask.

In further embodiments, given the ability of ceramic oxygen generator type on-board oxygen generator devices to perform better with input streams more highly concentrated in oxygen, it may be particularly advantageous to have another on-board oxygen generator device upstream of the ceramic oxygen generator device. This upstream on-board oxygen generator would serve to increase the oxygen concentration in the supply stream fed to the ceramic oxygen generator device beyond the oxygen concentration of an alternative air supply stream, for example engine bleed air.

As a further alternative, oxygen produced by the chemical oxygen generator generally has to be cooled before it is suitable for breathing and the heat removed in the cooling process could be used to provide heat for the second generator of the hybrid system. The second generator is the solid electrolyte oxygen separator, typically a ceramic oxygen generator, that depends upon substantial heating to reach operational temperatures in excess of 600° C.

The present invention is not limited to the embodiments described above. Various changes and modifications can, of course, be made, without departing from the scope and spirit of the present invention. Additional advantages and modifications will readily occur to those skilled in the art. Accordingly, various modifications may be made without departing from the spirit or scope of the general inventive concept as defined by the appended claims and their equivalents.

We claim:

1. A hybrid system for providing supplemental oxygen for breathing for crew or passengers of an aircraft, comprising:
    an on-board oxygen generator that requires heating to reach an operational temperature; and
    a chemical oxygen generator configured to produce oxygen and heat;
    a heat exchange interface disposed between said on-board oxygen generator and said chemical oxygen generator to provide thermal communication between said chemical oxygen generator and said on-board oxygen generator, said chemical oxygen generator including a chemical oxygen generating composition that is at least partially coated on said heat exchange interface, wherein said heat exchange interface is operative to supply the heat produced by the chemical oxygen generator to said on-board oxygen generator to thereby expedite attainment of the operational temperature for said on-board oxygen generator.

2. The hybrid system of claim 1, wherein said chemical oxygen generating composition is coated in an array on said heat exchange interface.

3. The hybrid system of claim 1, wherein said chemical oxygen generating composition is scattered in a random pattern on said heat exchange interface.

4. The hybrid system of claim 1, wherein said on-board oxygen generator comprises a solid electrolyte oxygen separator having at least one membrane configured to receive heat from the chemical oxygen generator.

5. The hybrid system of claim 4, wherein the solid electrolyte oxygen separator comprises a ceramic oxygen generator and said at least one membrane is a ceramic membrane.

6. The hybrid system of claim 1, further comprising at least one breathing mask connected in a communicating relationship with said chemical oxygen generator and said on-board oxygen generator, and configured to receive oxygen from at least one of the chemical oxygen generator and the on-board oxygen generator; and
    a pulsed oxygen delivery subsystem connected to both the chemical oxygen generator and the on-board oxygen generator and configured to regulate a flow of oxygen to said at least one breathing mask based on a sensed breathing pattern.

7. The hybrid system of claim 1, further comprising a controller configured to control said on-board oxygen generator and said chemical oxygen generator.

8. A hybrid system for providing supplemental oxygen for breathing for crew or passengers of an aircraft, comprising:
    a first on-board oxygen generator configured to supply oxygen in an initial stage, said first on-board oxygen generator including a chemical oxygen generator configured to produce heat through exothermic chemical decomposition reactions;
    a second on-board oxygen generator configured to generate oxygen on-board an aircraft in a subsequent stage, said second on-board oxygen generator including a solid electrolyte oxygen separator configured to catalytically separate oxygen from a supply stream of air at a temperature of 650° C. to 750° C. by applying an electrical voltage;
    a heat exchange interface disposed between said second on-board oxygen generator and said chemical oxygen generator of said first on-board oxygen generator to provide thermal communication between said chemical oxygen generator and said second on-board oxygen generator, said chemical oxygen generator including a chemical oxygen generating composition that is at least partially coated on said heat exchange interface, wherein said heat exchange interface is operative to supply the heat produced in the exothermic chemical decomposition reactions of the chemical oxygen generator to the second on-board oxygen generator to increase a rate at which the supply stream of air reaches an operating temperature of 650° C. to 750° C.; and
    a controller configured to control the first on-board oxygen generator and the second on-board oxygen generator.

9. The hybrid system of claim 8, wherein said chemical oxygen generating composition is coated in an array on said heat exchange interface.

10. The hybrid system of claim 8, wherein said chemical oxygen generating composition is scattered in a random pattern on said heat exchange interface.

11. The hybrid system of claim 8, wherein the solid electrolyte oxygen separator comprises a ceramic material configured to catalytically separate oxygen from the supply stream of air.

12. The hybrid system of claim 8, further comprising at least one breathing mask in a communicating relationship with the first on-board oxygen generator and the second on-board oxygen generator, whereby said at least one breathing mask is configured to receive oxygen from at least one of the first on-board oxygen generator and the second on-board oxygen generator; and
    a pulsed oxygen delivery subsystem connected to both the first on-board oxygen generator and the second on-board oxygen generator and configured to regulate flow of oxygen to said at least one breathing mask based on a sensed breathing pattern.

* * * * *